United States Patent [19]
Lovett

[11] Patent Number: 5,964,419
[45] Date of Patent: *Oct. 12, 1999

[54] WATER SPRINKLER APPARATUS FOR AUTO BODY REPAIR OPERATIONS

[76] Inventor: Alvin L. Lovett, 3948 Hackberry, Imperial, Mo. 63052

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,654

[22] Filed: Mar. 3, 1997

[51] Int. Cl.⁶ .................................................. B05B 1/20

[52] U.S. Cl. ......................... 239/532; 239/556; 239/567

[58] Field of Search ..................... 239/532, 548, 239/556, 558, 560, 562, 152, 154, 557, 567, 145, 270, 450, 559, 602; 134/45, 123, 166 R, 167 R, 167 C, 172, 198, 169 A, 169 C, 170; 7/100

[56] References Cited

U.S. PATENT DOCUMENTS

| 1,697,068 | 1/1929 | Kenney | 134/123 X |
|---|---|---|---|
| 2,321,431 | 6/1943 | Somes | 239/567 X |
| 2,345,808 | 4/1944 | Green | 239/567 X |
| 3,727,841 | 4/1973 | Hengesbach | 239/547 X |
| 4,600,153 | 7/1986 | Stone | 239/560 X |
| 4,672,817 | 6/1987 | Croce | 239/145 X |
| 4,778,111 | 10/1988 | Leap | 239/567 X |
| 5,573,187 | 11/1996 | Proctor | 239/532 |

*Primary Examiner*—Lesley D. Morris
*Attorney, Agent, or Firm*—Polster, Lieder, Woodruff & Lucchesi, L.C.

[57] ABSTRACT

Water sprinkler apparatus to be used in combination with a welding or cutting torch to apply a cooling medium to the areas of an autobody upon which heat due to a welding operation or a cutting operation needs to be controlled to the autobody area either internal or external upon which repair work is performed.

15 Claims, 4 Drawing Sheets

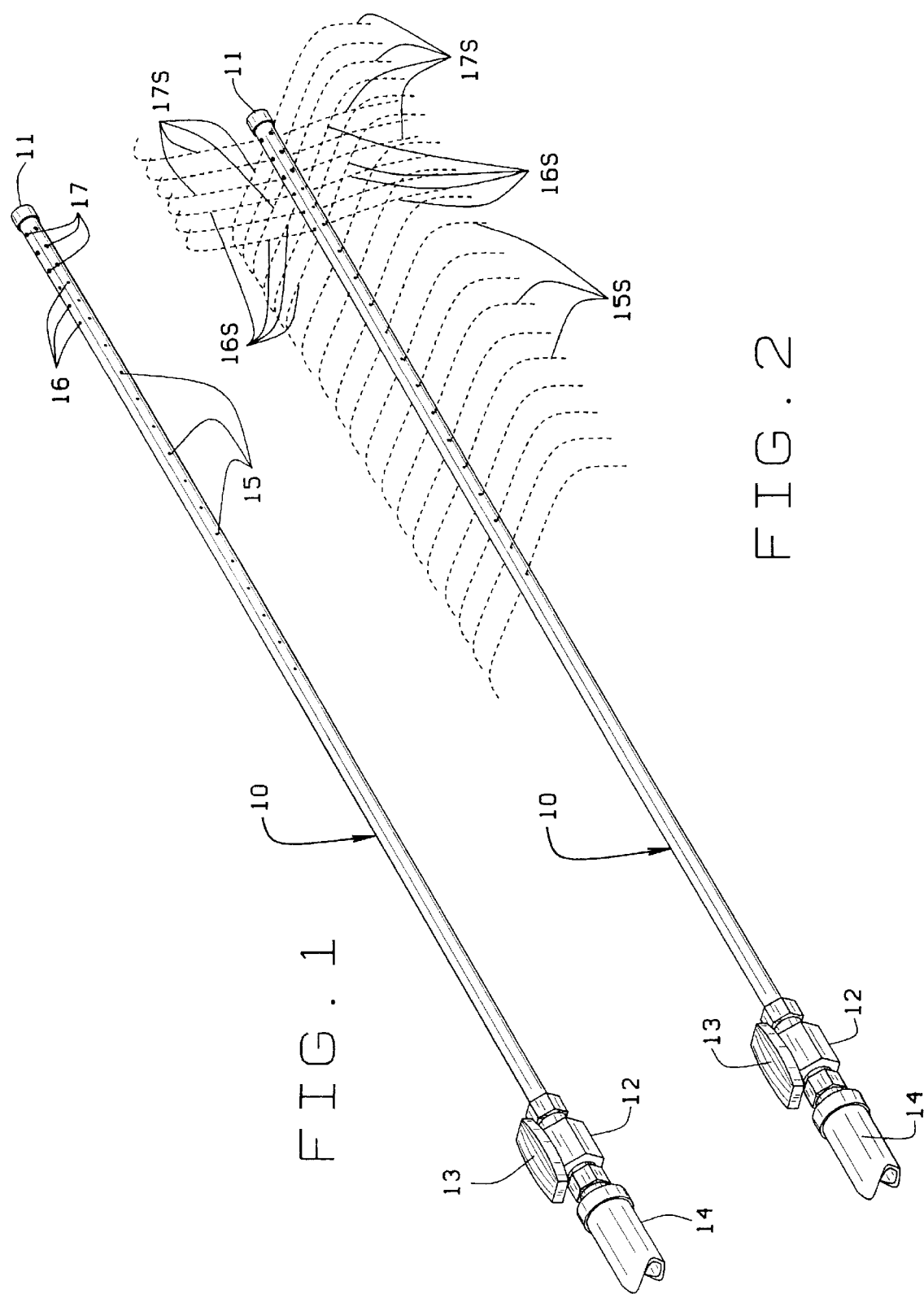

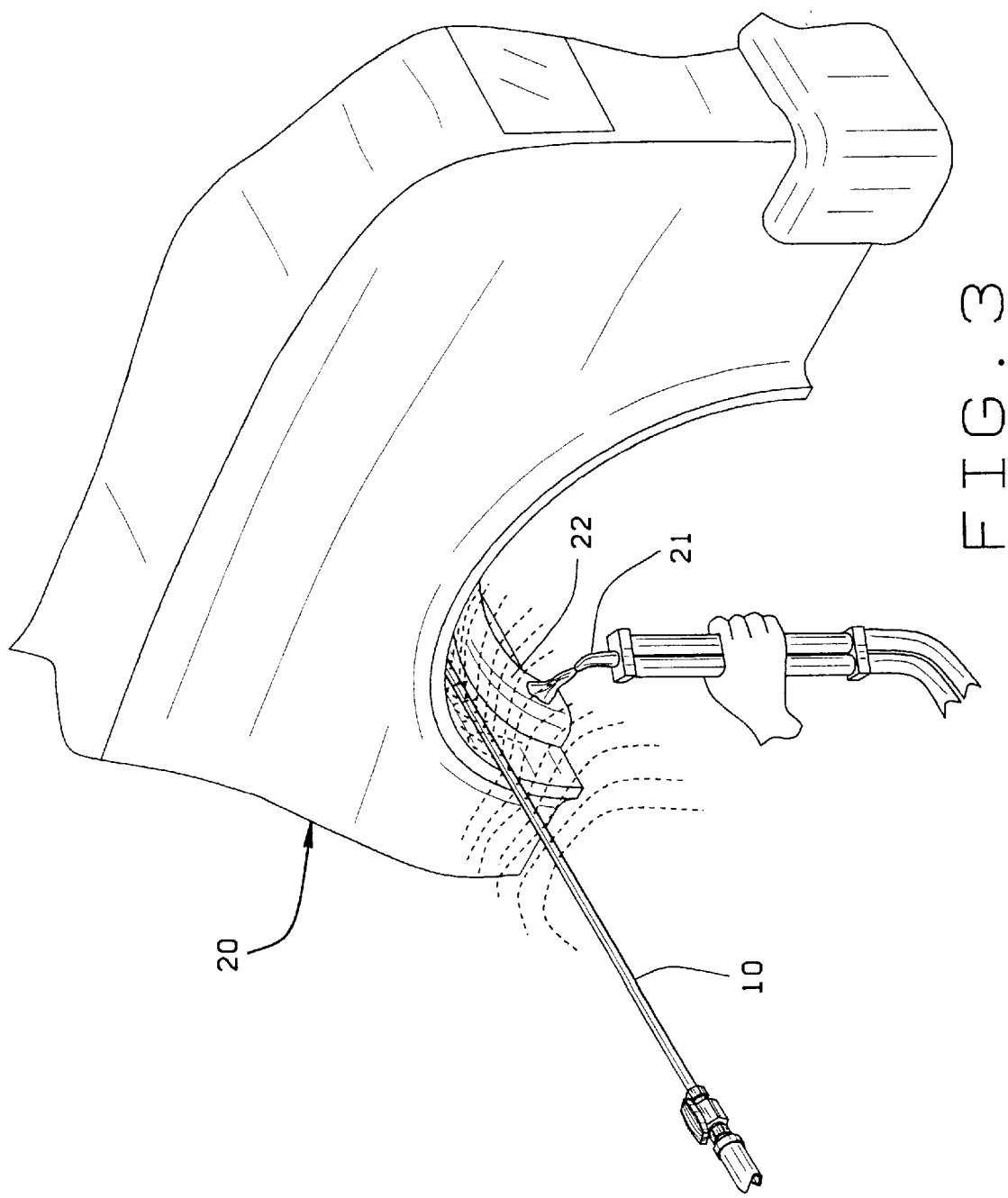

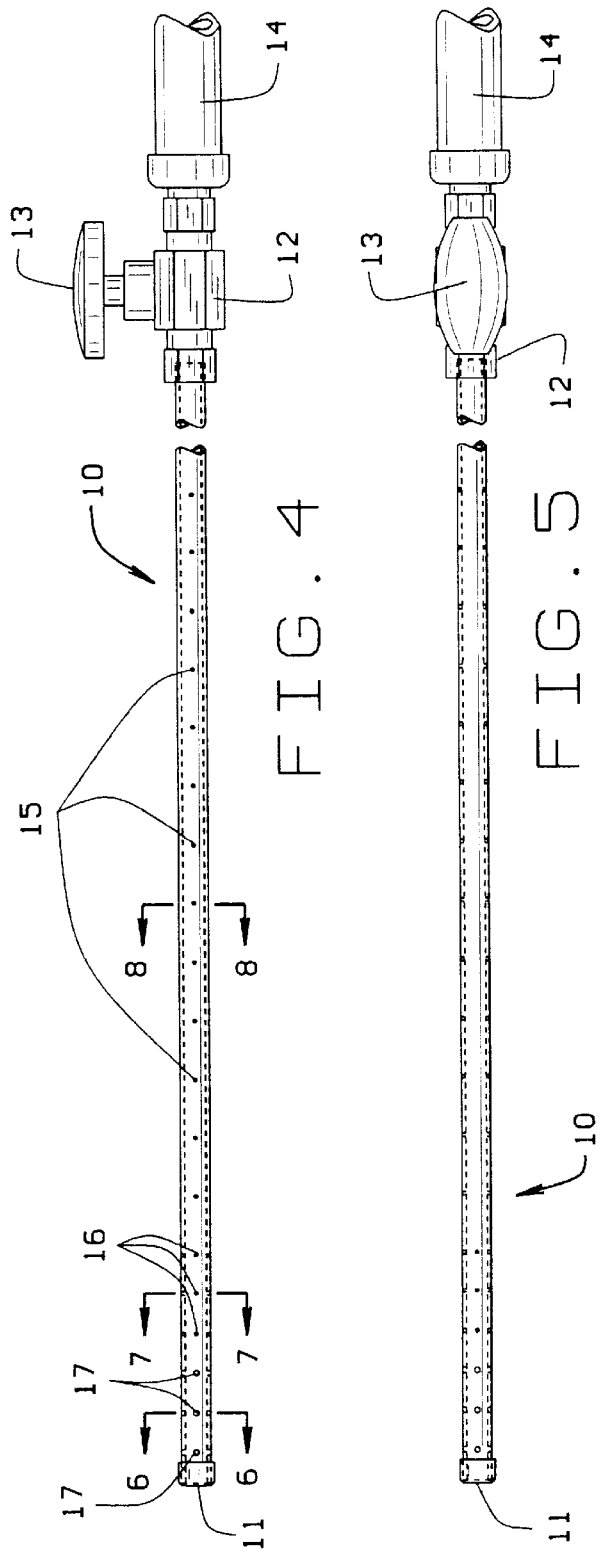
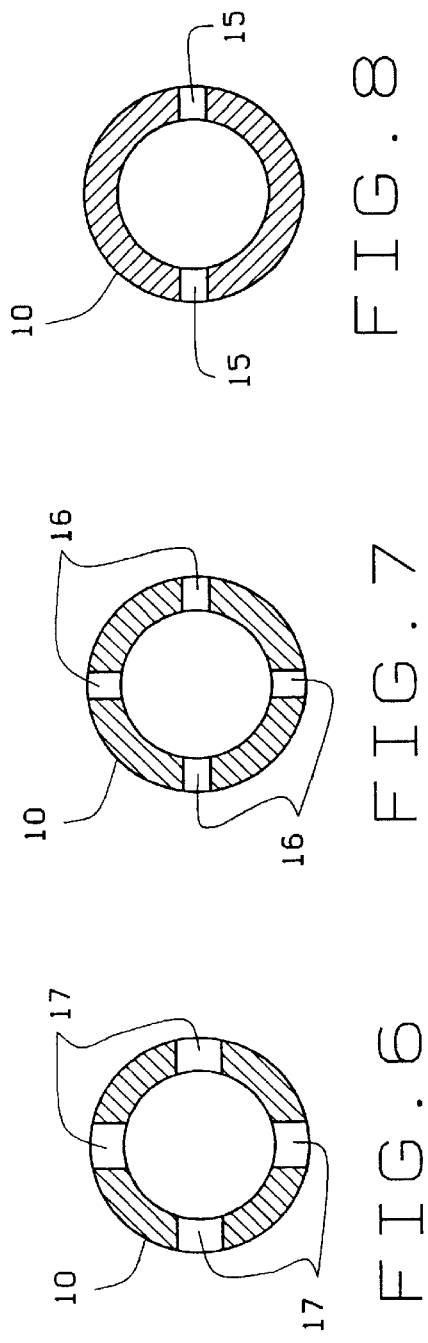

WATER SPRINKLER APPARATUS FOR AUTO BODY REPAIR OPERATIONS

STATEMENT REGARDING FEDERALLY SPONSORED RESEARCH OR DEVELOPMENT

Not Applicable.

BACKGROUND OF THE INVENTION

In the repair of automobile bodies the work can be performed in a welding shop which often involves the use of welding equipment as well as cutting torch equipment, and such use of equipment requires water sprinkler apparatus applied to areas under repair to prevent heat and fire damage.

BRIEF SUMMARY OF THE INVENTION

The object of the invention is to provide a water sprinkler apparatus that is capable of applying water as a cooling medium and fire control to areas in and on an auto body requiring repair when using heat generating methods of carrying out a repair operation.

A further object is to provide a water sprinkler apparatus capable of being inserted into an auto body cavity to apply cooling fluid to the area undergoing exterior repair.

Other objects and advantages associated with water sprinkler apparatus will be set forth in the following details.

BRIEF DESCRIPTION OF THE SEVERAL VIEWS OF THE DRAWINGS

In the drawings, FIG. 1 is a perspective view of a water cooling sprinkler apparatus easily adapted to manual application in association with auto body repairs;

FIG. 2 is a further view of the water cooling sprinkler apparatus demonstrating the nature of the spray delivery;

FIG. 3 is a fragmentary perspective view of a body fender in which cooling water is applied to an exterior surface subject to the heat and flame of a cutting torch;

FIG. 4 is an longitudinal view of a water sprinkler apparatus showing the control over water delivery and the disposition of water outlet ports;

FIG. 5 is a view similar to FIG. 4 with the apparatus turned to looking down upon the apparatus seen in FIG. 4;

FIGS. 6, 7 and 8 respectively are section view of the apparatus of FIG. 4 to illustrate the water outlet ports distributed along the apparatus;

Corresponding reference numerals will be used throughout the several figures of the drawings.

DETAILED DESCRIPTION OF THE INVENTION

Figure 9:
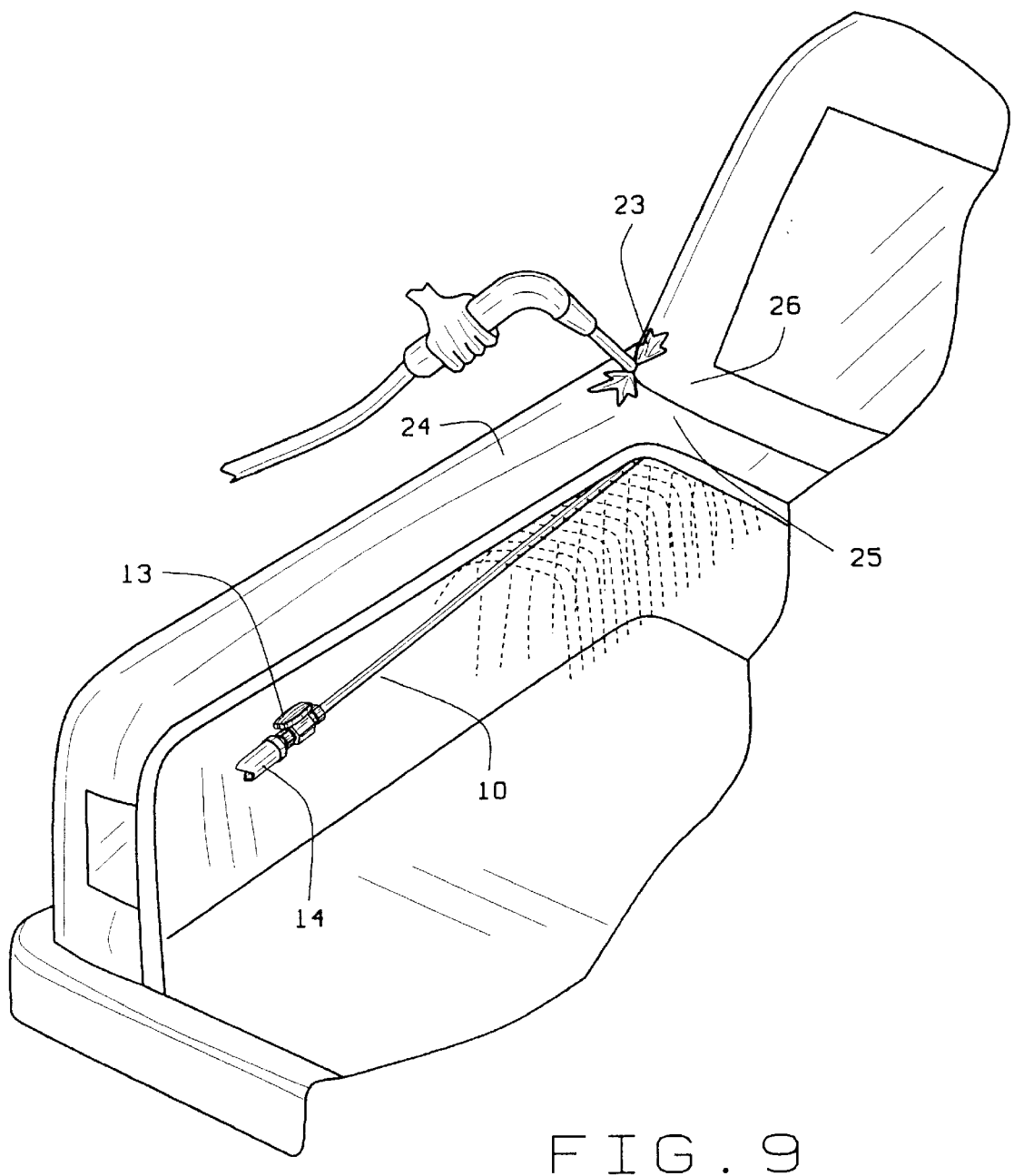
FIG. 9 is a perspective view of an exterior auto body repair requiring the interior positioning of the water sprinkler apparatus.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

The sprinkler apparatus of FIG. 1 is composed of a flexible tube 10, capped at one end 11 and provided with a control valve 12 at the opposite end with an adjustment handle 13 adjacent a supply tube 14 threaded onto the valve 12 so that cooling fluid from a remote supply can be made available to the tube 10. The tube 10 is provided with a series of cooling fluid outlet ports 15 extending along the tube length and opening at opposite sides. A second series of ports 16 are provided that open in four circumferentially spaced ports, and lastley near the capped end 11 a third series of ports are formed at 17 with four outlets.

The view of FIG. 2 illustrates the arrangements of the delivery ports for the cooling fluid. By comparing the respective views of FIGS. 6, 7 and 8 with FIG. 2 it is seen that the ports 15 of FIG. 8 deliver the cooling fluid from opposite sides to form delivery sprays 15S. The delivery of cooling fluid at ports 16, as in FIG. 7, is from ports spaced at 90° around the tube so that spray 16S will be directed out of four sides of the tube. Finally, the end ports 17 of FIG. 6 are sized to deliver cooling fluid at spray 17S.

The sizing of the cooling fluid outlet ports is best seen the FIGS. 6, 7 and 8. The port 15 are spaced apart at 180°, have a bore size of 0.040", and are spaced along the tube 10 at intervals of about ¾ inches. The second series of ports 16 open at 90° and are of the same bore size of ports 15 and are spaced at intervals of ½ inch. Finally, the ports 17 open at 90° spacing and have a larger bore of 059". It is desired to concentrate the flow of cooling fluid adjacent the end of the tube 10 where the greatest heat is applied by the cutting torch or where the welding occurs, while the rest of the cooling flow ports deliver cooling effect surrounding the area under repair either by the heat of a cutting flame or the heat from the addition of welding material. Furthermore the sizing of the ports from the smallest at the inlet end to the largest at the remote end of the tube 10 reflects the distribution of the cooling flow to assure an adequate quantity where the heat from repair work is generally concentrated.

FIG. 3 illustrates the use of the cooling fluid sprinkler apparatus in the area under an auto fender 20 where the heat from a cutting torch 21 is concentrated. The cooling fluid tube 10 is positioned where the cooling fluid is concentrated so that heat picked up by the frame of the auto wheel well 22 is rapidly cooled so the distructive heat is dissipated. In the view of FIG. 3, the repair work is being performed on a Corvette which has a FIBERGLAS body that is subject to heat damage from welding or cutting equipment.

A further example of the utility of the sprinkler apparatus is seen in FIG. 9 in connection where a weldment 23 is being applied to an auto body 24, to establish a connection between a panel 25 of the body 24 and panel 26 of the top. In this application the trunk cover is removed so that the cooling tube apparatus 10 can be inserted under the interior of the panel 26 to control the heat generated by the exterior deposits of welding material 23 to connect the body panel 24 to the top panel 26.

The view of FIG. 2 illustrates the effect of the spray control obtained by adjusting the adjustment handle 13 to select the strength of the spray from the several spray ports 15, 16 and 17.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

I claim:

1. In combination with a body of an automotive vehicle, which body has a component that requires repair by the application of heat to that component, an apparatus for directing a cooling fluid at the component while heat is applied to the component, said apparatus comprising: a tube located along the component, the tube having ends and also having ports which open laterally from it; and a valve connected to one end of the tube for admitting a cooling fluid the tube, whereby the cooling fluid is discharged from the ports and impinges against in the component to prevent excessive transfer of heat to nearby components of the vehicle.

2. The combination according to claim 1 wherein the other end of the tube is closed and the ports are spread longitudinally along the tube.

3. The combination according to claim 2 wherein the ports near the closed end are configured and arranged to deliver more cooling fluid than the ports closer to the valve.

4. The combination according to claim 3 wherein the ports near the closed end of the tube are arranged at 90° intervals around the tube and the ports near the valve are arranged at 180° intervals.

5. The combination according to claim 1 wherein the tube is flexible.

6. The combination according to claim 1 wherein the component of the body is a body panel.

7. The combination according to claim 1 and further composing a torch which produces a flame that impinges on the body component.

8. The combination according to claim 7 and further comprising a liquid cooling fluid that flows through the valve and tube and is discharged from the tube through the ports, at least some of the cooling fluid impinging on the body component against which the flame from the torch impinges.

9. The combination according to claim 8 wherein body component has two faces; and wherein the flame impinges against one face and the cooling fluid against the other face.

10. The combination according to claim 8 wherein the body component has a face and the flame and cooling fluid impinges against that face.

11. A method of repairing a damaged component of a body for an automotive vehicle, said method comprising: applying heat to the damaged component; placing a tube along the component with the tube having ports that open laterally from it, and introducing the cooling fluid into the tube so that the fluid leaves the tube through the ports and impinges against the component as the heat is applied.

12. The method according to claim 11 wherein the cooling fluid is water.

13. The method according to claim 12 wherein the step of applying heat to the damaged component comprises directing a flame at the damaged component so that the flame impinges on a surface of the component.

14. The method according to claim 13 wherein the component has interior and exterior surfaces, and the flame is directed at the exterior surface, while the cooling fluid is directed against the interior surface.

15. The method according to clam 13 wherein the flame and cooling fluid are directed at the same surface of the damaged component.

* * * * *